INVENTOR.
LEONARD OCHTMAN
BY
*ATTORNEY*

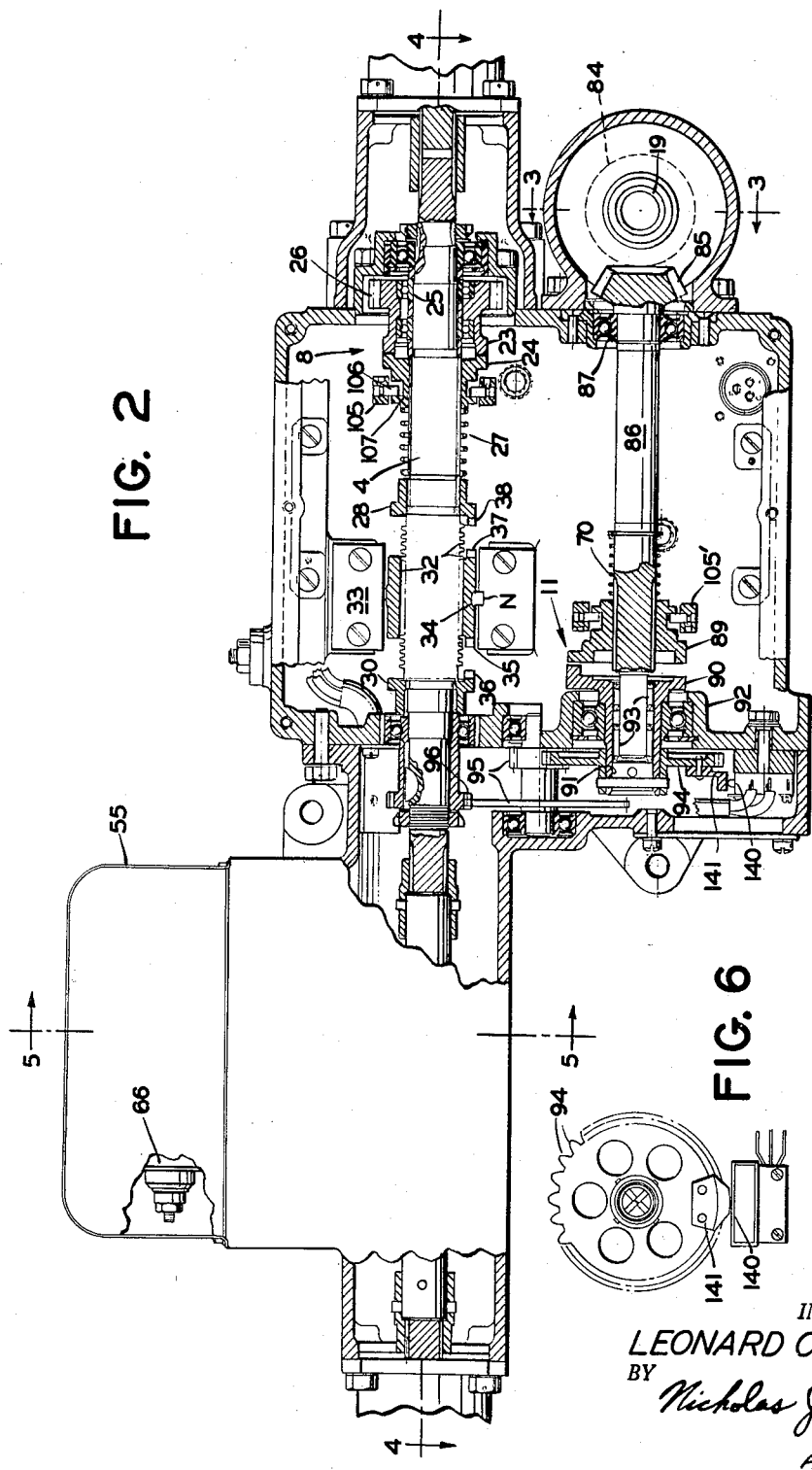
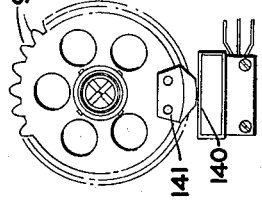

Sept. 16, 1958  L. OCHTMAN  2,852,215
COMBINED MANUAL AND POWER CONTROL SYSTEM FOR
AIRCRAFT CONTROL SURFACES
Filed Nov. 29, 1954  7 Sheets-Sheet 3
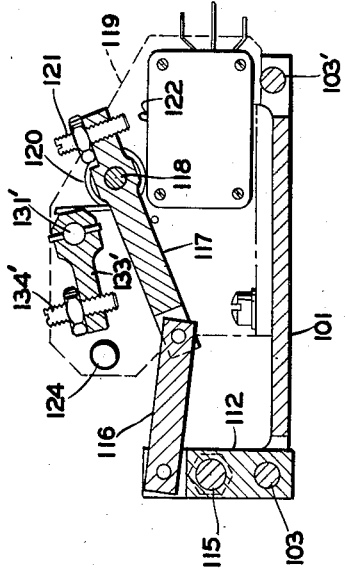
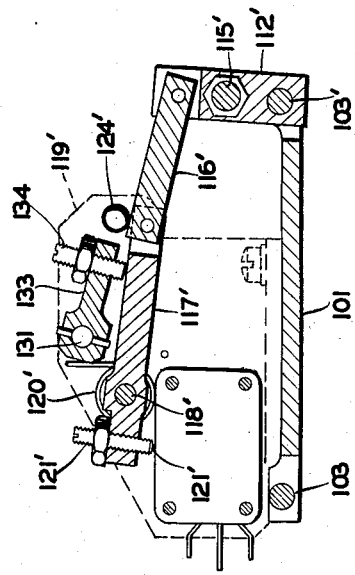
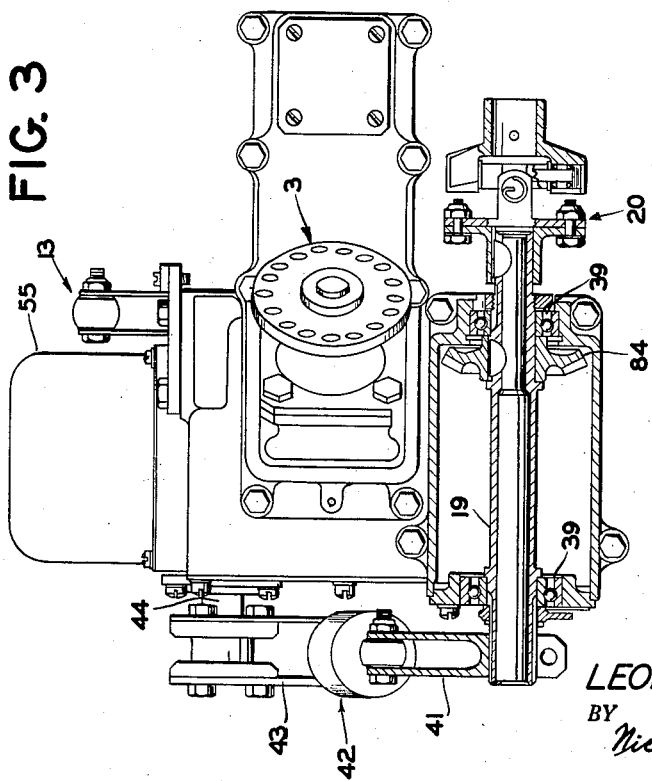
INVENTOR.
LEONARD OCHTMAN
BY Nicholas J. Garofalo
ATTORNEY

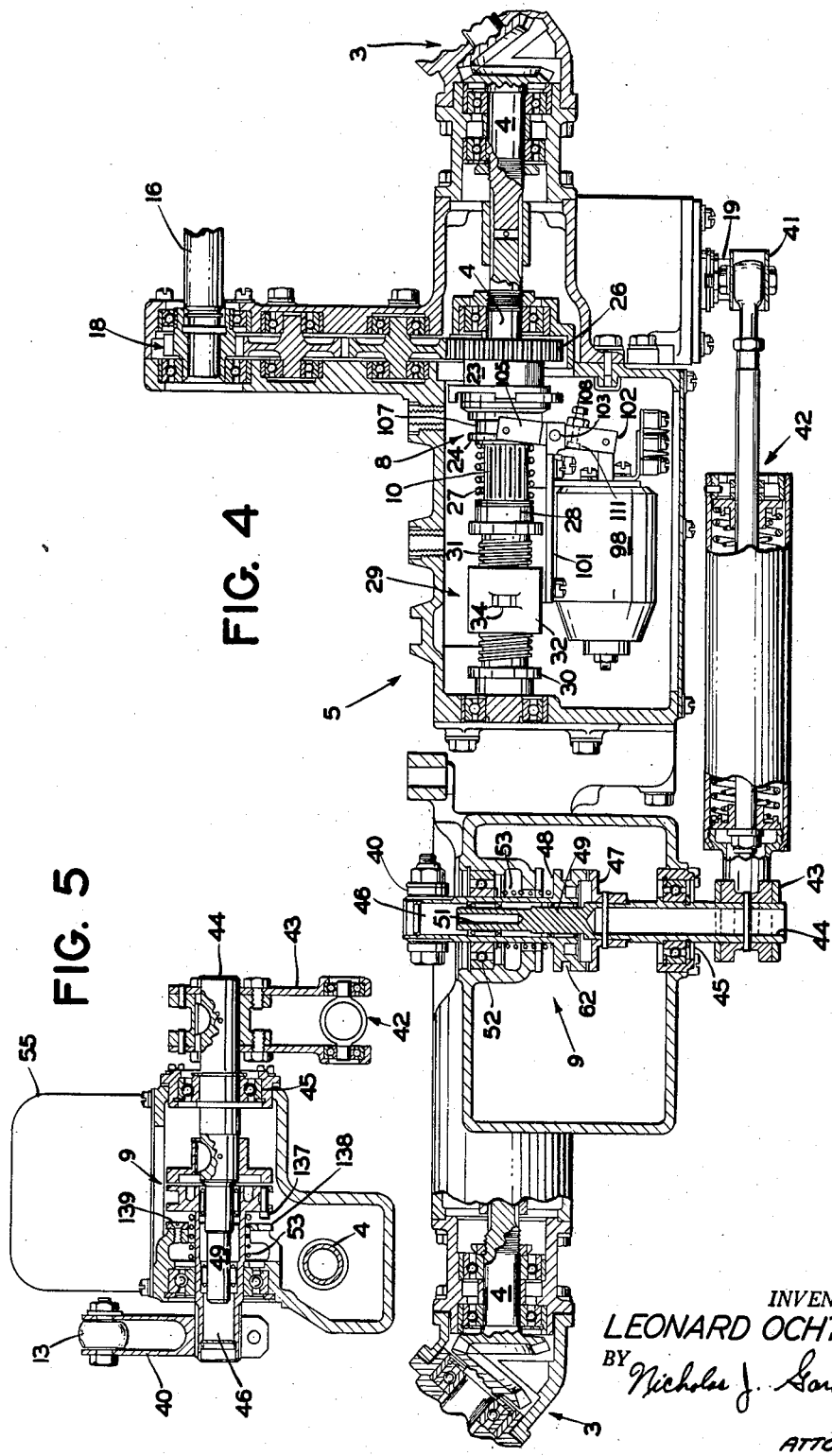

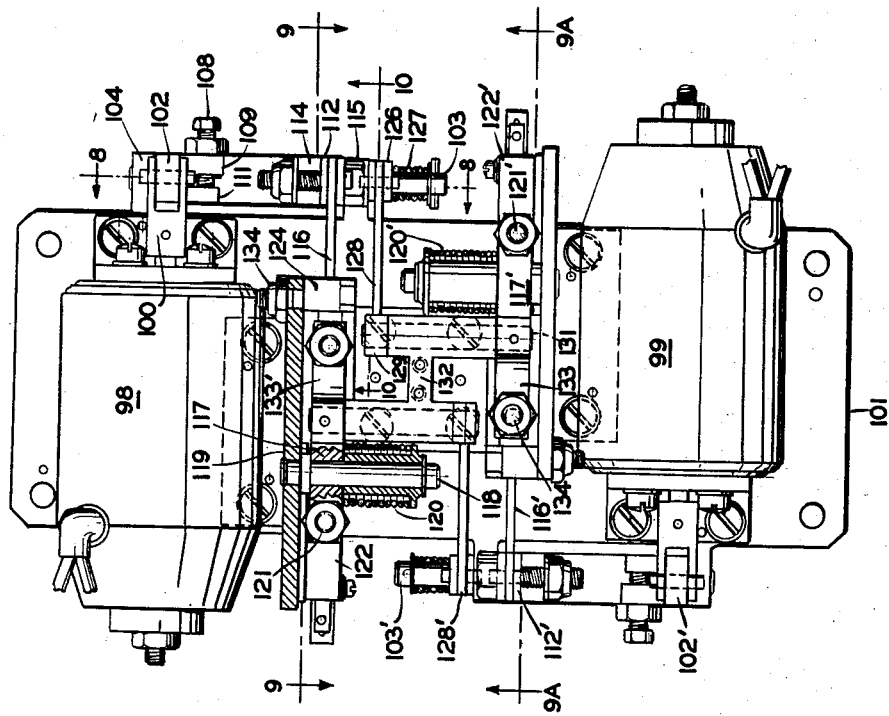

Sept. 16, 1958 L. OCHTMAN 2,852,215
COMBINED MANUAL AND POWER CONTROL SYSTEM FOR
AIRCRAFT CONTROL SURFACES
Filed Nov. 29, 1954 7 Sheets-Sheet 6
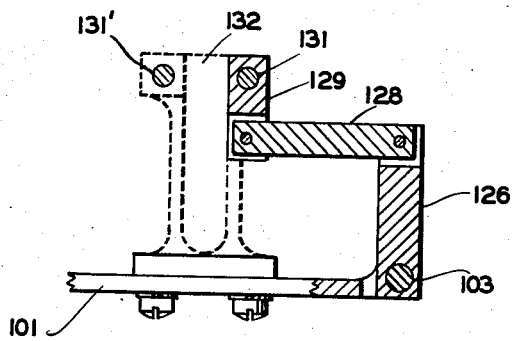
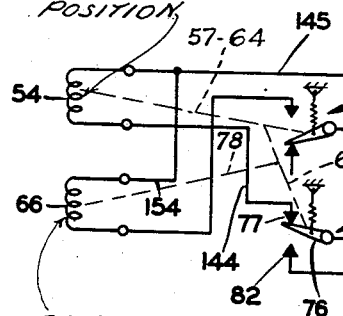
INVENTOR.
LEONARD OCHTMAN
BY *Nicholas J. Garofalo*
ATTORNEY Sept. 16, 1958 L. OCHTMAN 2,852,215
COMBINED MANUAL AND POWER CONTROL SYSTEM FOR
AIRCRAFT CONTROL SURFACES
Filed Nov. 29, 1954 7 Sheets-Sheet 7

INVENTOR.
LEONARD OCHTMAN
BY
Nicholas J. Garofalo
ATTORNEY

United States Patent Office 2,852,215
Patented Sept. 16, 1958

2,852,215

COMBINED MANUAL AND POWER CONTROL SYSTEM FOR AIRCRAFT CONTROL SURFACES

Leonard Ochtman, Ridgewood, N. J., assignor to Bendix Aviation Corporation, Teterboro, N. J., a corporation of Delaware Application November 29, 1954, Serial No. 471,658

3 Claims. (Cl. 244—83)

This invention relates to power control systems for operating aircraft control surfaces, particularly ailerons, wherein the pilot's stick controls the application of power from a power unit to move the ailerons. The invention is more particularly concerned with a novel power boost system for this purpose wherein there is combined and integrated with the power boost system a manual control for the system selectively serving as an alternate means of mechanically operating the ailerons under manual force in the event of failure of the power system or otherwise.

An object of the invention is, therefore, to combine in a power control system for operating aircraft control surfaces, alternate means permitting manual operation thereof.

Another object of the invention is to provide selective means for manual control of a movable airfoil section or manual control of power boost means to operate said airfoil sections.

Another object of the invention is to provide an improved and practical power control transmission system that will enable selective application through the pilot's stick of either power operated means or manual effort in moving the ailerons of aircraft.

A further object of the invention is novel and improved mechanism of a practical and efficient nature for operating aircraft control surfaces.

A more particular object of the invention is an improved power control transmission unit whereby either manual or servo-motor power in moving the ailerons of an aircraft may be controlled through the pilot's stick.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 2 is a top plan of the power control transmission unit having the upper section cut away to better disclose the interior;

Fig. 3 is a right end view of Fig. 2 with a portion sectioned on the line 3—3 of Fig. 2;

Fig. 4 is a longitudinal vertical section on line 4—4 of Fig. 2 and shows the solenoid latching means;

Fig. 5 is a section on line 5—5 of Fig. 2;

Fig. 6 is a detail of the manual drive gear;

Fig. 7 is a detail of the solenoid engage and disengage mechanism shown in Fig. 4;

Fig. 8 is a section on line 8—8 of Fig. 7;

Fig. 9 is a section on line 9—9 of Fig. 7 detailing the clutch fork locking mechanism and the means for releasing the same;

Fig. 9A is a section on line 9A—9A of Fig. 7;

Fig. 10 is a section on line 10—10 of Fig. 7;

Fig. 14 is a wiring diagram of the solenoid circuits in which there has been indicated schematically by dotted lines the operative relation between the several control solenoids and the respective switch elements and in which corresponding numerals indicate schematically parts shown in structural detail in Figures 2-13 and described in detail hereinafter.

Figure 1:
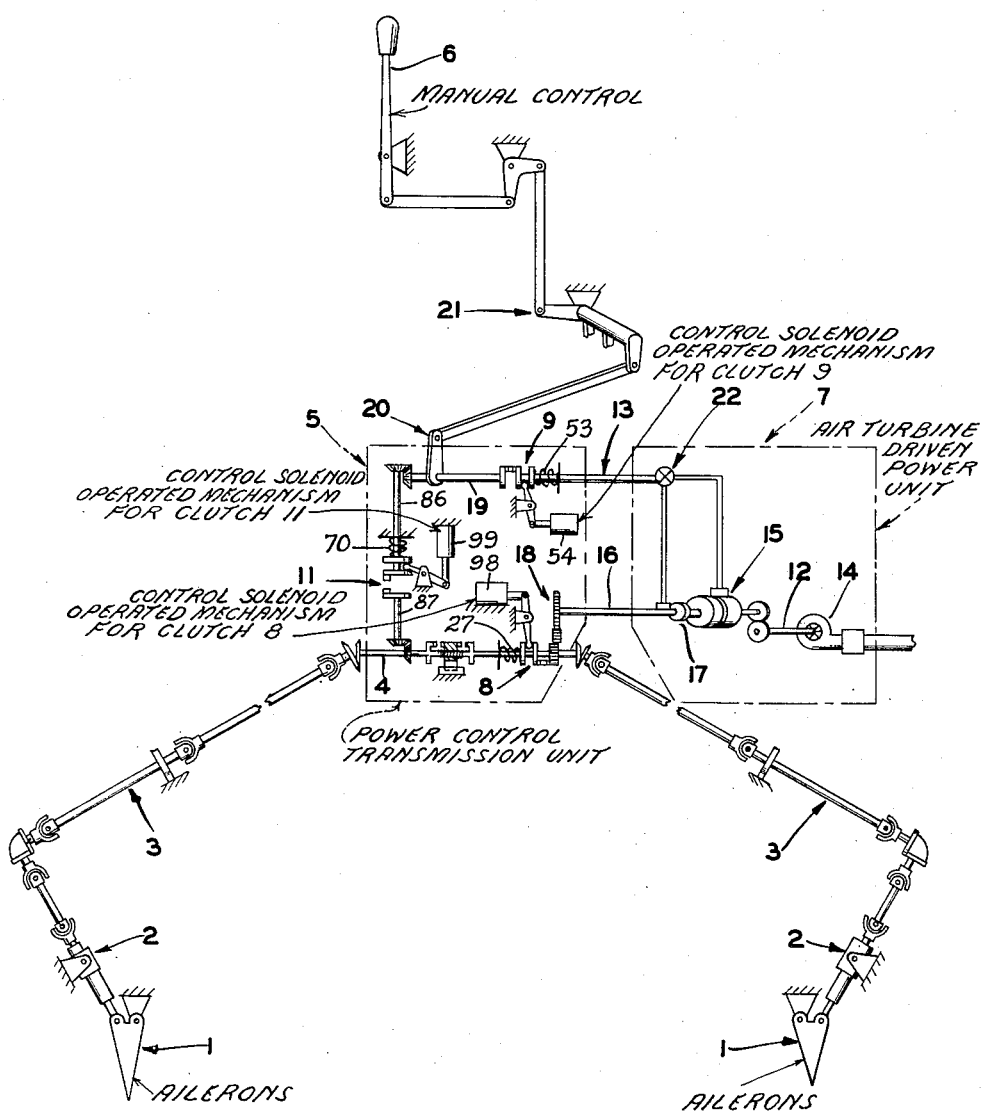
Fig. 1 is a schematic diagram of an aileron power control system embodying the invention and illustrating schematically the operative relation between the several control solenoids and respective clutch elements and in which corresponding numerals indicate schematically parts shown in structural detail in Figures 2-13 and described in detail hereinafter.

In describing the invention in further detail, reference is directed to the several drawings wherein there is disclosed (Fig. 1) ailerons 1 of an aircraft which are operatively connected to the ends of an aileron drive shaft 4 for movement by suitable screw jacks 2 and appropriate shafting 3. Shaft 4 is a part of a power control transmission unit 5. Shaft 4 is rotatable in either direction so as to move the ailerons from a neutral to an up or down position. Shaft 4 may be operated by manual effort, exerted through the pilot's stick 6 and transmitted to shaft 4 through suitable connecting linkage. Shaft 4 may also be operated by mechanical power derived from a suitable power unit 7, that is also connected for control and operation of the pilot's stick. Shaft 4 is normally connected for operation by the power unit 7 under control of the pilot's stick through normally engaged solenoid controlled clutches 8 and 9 biased into engaging relation by suitable spring elements and disengaged upon energization of suitable control solenoids. A solenoid controlled clutch 11 normally held in a disengaged position by a suitable latch mechanism prevents application of manual effort to the shaft 4 until energization of a suitable control solenoid whereby the latch mechanism is released and the clutch 11 biased by a suitable spring element into engaging relation as hereinafter explained. Suitable circuits (Fig. 14) are provided to control operation of the solenoid controlled clutches, whereby operation of shaft 4 and the associated ailerons may be switched, as desired, from power operation to manual operation, and back again to power operation. Limited energization of the solenoid means is provided by a timing switch having a cam.

Power unit

The power unit 7 (Fig. 1) is of a suitable nature, and it is preferably of the reversing type, such as is disclosed in my pending application for an Actuator Mechanical Control System bearing Serial No. 390,838, filed November 9, 1953. The power unit includes a drive shaft 12 powered by an air-driven turbine 14. Reversible drive power-transmission mechanism 15 is employed in the power unit in order to connect the turbine drive shaft with an output shaft 16. The latter connects through a protective slip clutch 17, a gear train 18 and through solenoid controlled clutch 8 with the aileron drive shaft 4. Disengagement of clutch 8 disengages the power drive unit from shaft 4. The reversible power transmission mechanism 15 is controlled in its operations by the pilot's stick. It is operatively connected to the pilot's stick through solenoid controlled clutch 9, a control shaft 19, leverage 20, and suitable linkage 21. It is clear that disengagement of clutch 9 will prevent operation by the pilot's stick of the reversible drive mechanism. Suitable follow-up mechanism 22 associated with the power unit is connected intermediately of the pilot's stick connections to the reversible drive mechanism and is further connected to the output shaft 16. The follow-up mechanism is settable by the pilot's stick as the latter effects operation of the reversible drive mechanism, and it serves to follow the rotation of the output shaft. The follow-up mechanism acts to automatically disengage the power transmission mechanism 15 from the turbine drive shaft after the output shaft 16 has been rotated sufficiently to effect through the aileron drive shaft 4 a movement of the ailerons to a position as predetermined by movement of the pilot's stick, all in a manner as described in the pending application mentioned above.

*Power control transmission unit*

The manner whereby either mechanical power from the power unit 7, or manual effort is selected and applied to rotate the aileron drive shaft 4 in order to operate the ailerons, will become further apparent by a more detailed description of the power control transmission unit 5 which represents a main feature of this invention. Clutch 8 is carried on the aileron drive shaft 4 (Figs. 2, 4). It associates shaft 4 with the power unit output shaft 16. Clutch 8 is of the draw type, comprising two separable members 23 and 24. Member 23 is mounted for free rotatable movement upon the outer races of bearings 25 carried by shaft 4, and it includes a peripheral gear 26 meshed with the power unit gear input gear 18. Clutch member 24 is splined at 10 for axial slidable movement on shaft 4. A coil spring 27 limited between an end wall of clutch member 24 and a fixed collar stop 28 constantly tensions clutch member 24 so that a jaw face of the latter is normally in clutching engagement with a complementary jaw face of clutch member 23. By this arrangement, power transmitted from the power unit 7 through gear train 18 to the engaged clutch 8 will rotate the aileron drive shaft 4.

Suitable stop means 29 is provided whereby shaft 4 is limited in its directional rotation from neutral position. It comprises a pair of collars or stops 28, 30 fixed upon shaft 4 and spaced from one another by a threaded section 31 on which a nut 32 is adapted to travel axially in either direction from a neutral position N accordingly as shaft 4 rotates in one direction or the other. Nut 32 is guided in its axial movement by a pair of opposed stationary plates 33 engaged by slotted lugs or runners 34 that project from the peripheral surface of the nut. A jaw 35 at one end of the nut is adapted to engage a complementary jaw 36 on stop 30 to limit travel of the nut and further rotation of the shaft in one direction; similar jaws 37, 38 cooperate to limit travel of the nut and shaft in the opposite direction.

The pilot's control stick, which, as previously mentioned, serves through the follow-up mechanism 22 and the power transmission device 15 to control the connection of the aileron drive shaft 4 with the turbine power drive shaft 12, is connected (Figs. 3, 4) by lever or flange 20 to the input control shaft 19. The latter is supported for turning in suitable housing bearings 39; it connects by a lever 41, suitable spring cushioned linkage 42 and a lever 43 to a control stick disconnect shaft 44. The latter is supported for turning in suitable housing bearings 45, and it connects by draw clutch 9 with a clutch shaft 46. The latter is slidably splined at its end in a lever 40 of suitable linkage 13 that connects through the follow-up mechanism 22 with the power transmission device 15. The arrangement is such, that movement of the pilot's control stick turns the control shaft 19. This action effects through clutch 9 and the associated linkage setting of the follow-up mechanism 22 and also operation of the power transmission device 15 to connect the turbine drive shaft 12 with the power unit output shaft 16, so as to effect turning of the aileron drive shaft 4.

*Control of clutch 9*

The pilot's stick may be rendered ineffective to operate the power transmission device 15 by uncoupling clutch 9, and thereby causing a disengagement of the control shaft 19 from the power transmission device 15. Clutch 9 is of the draw type, comprising two separable members 47, 48, of which member 47 is pinned fast to disconnect shaft 44. The latter shaft has an elongated reduced portion 49 that extends axially beyond clutch member 47 and is supported for turning movement in bearings 51. Clutch member 47 has a jaw end engageable with a complementary jaw end of clutch member 48. Member 48 has an axial, elongated hollow extension forming the shaft 46. The latter sleeves the bearings 51. Shaft 46 is adapted to slide in housing bearing 52 as clutch 9 is disengaged. A coil spring 53 about clutch extension 46 constantly tensions clutch member 48 into engagement with clutch member 47.

Figure 11:
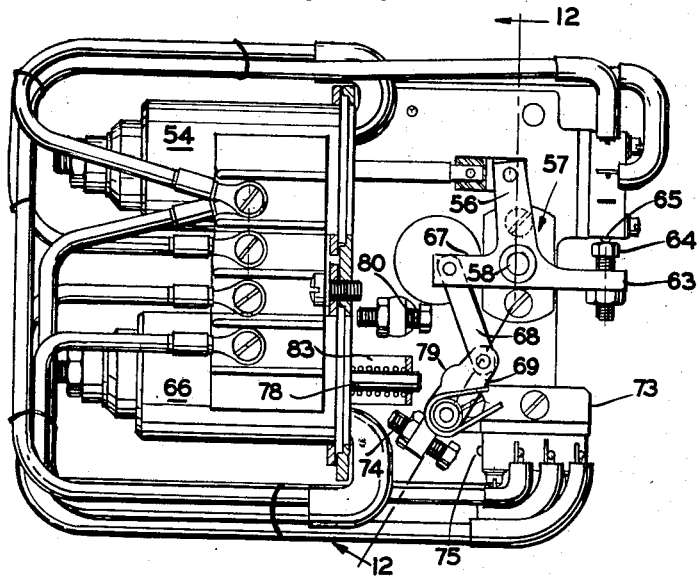
Fig. 11 is a detail of the disconnect solenoid controls associated with clutch 9.
Figure 13:
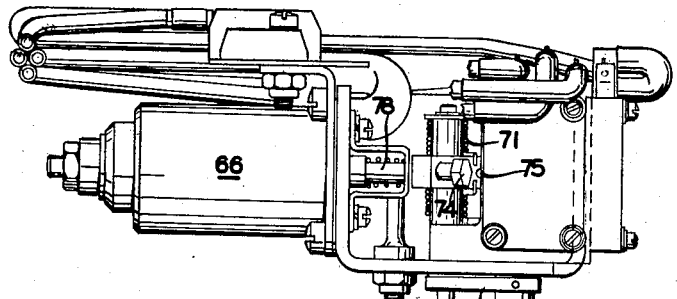
Fig. 13 is a side elevational view of Fig. 11.
Figure 12:
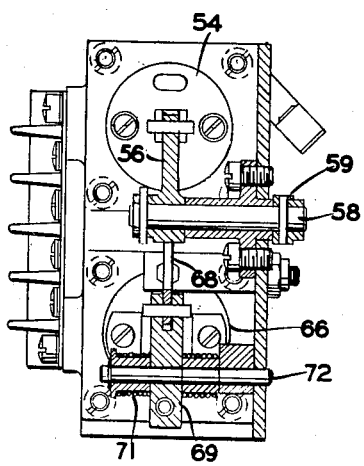
Fig. 12 is a section on line 12—12 of Fig. 11.

Solenoid controlled means (Figs. 2, 4, 11–13) is employed to slide clutch member 48 out of engagement; other means is provided for simultaneously de-energizing the solenoid circuit and locking the clutch member 48 in its disengaged position. This control means includes a solenoid 54 adequately supported in housing 55 of the power control transmission unit. Pivoted to the end of the solenoid core is an arm 56 of a tri-arm lever 57 that is mounted fast upon an end of a rock shaft 58. The latter has pinned to the opposite end thereof a lever 59 having a projecting pin 61 which is engaged in an annular peripheral groove 62 of clutch member 48. A second arm 63 of lever 57 carries an adjustable screw 64, the head of which screw normally presses upon and holds open a spring electrical contact 65 in a circuit to another solenoid 66 that is supported adjacent solenoid 54. A third arm 67 of lever 57 has pivoted to its end a toggle link 68 at the free end of which is pivoted a toggle arm 69. Torsion springs 71, carried by a lateral pin 72 in arm 69, have free ends limited by a fixed block 73. Toggle joint of elements 68, 69 is normally pivoted (Fig. 11) to a position to the right of center, and it is there held against the opposed tension of springs 71 by means of the greater counter force of the coil spring 53 of clutch 9 acting on the lever arm 57 through the pin 61 of clutch member 48 and the associated rock shaft 58. The free end of toggle arm 69 carries an adjustable screw 74, the head of which overhangs a two-way switch 75. An arm 76 (Fig. 14) of this switch is normally closed on a contact 77 in the circuit to solenoid 54. Solenoid 66, here called a restoring solenoid, cooperates with solenoid 54 and includes a core 78 that projects to a position in close spaced relation to a nose 79 on the side of toggle arm 69. The arrangement is such that, when a change-over switch 81 (Fig. 14) is thrown from the power contact P to the manual contact M with the view to disconnecting the power unit 7 from the control of the pilot's stick, a circuit is closed through contact 77 to energize solenoid 54, whereupon tri-arm lever 57 is turned clockwise (Fig. 11). This action rocks shaft 58 and causes clutch lever pin 61 to slide clutch member 48 out of engagement from clutch member 47. Further, this action removes the screw head 64 from open switch contact 65, causing the latter to mechanically close. This prepares a circuit to the restoring solenoid 66 to permit energization of the latter when the throw switch 81 is restored to power contact P. Clockwise actuation of lever arm 67 through energized solenoid 54 also snaps the toggle joint of elements 68, 69 to the left of center against the adjustable stop 80 with the aid of the torsion springs 71. As a consequence of the latter action, the turned position of lever 57 is locked by the toggle, and clutch 9 is held disengaged. This shifting of the toggle joint also brings the screw head 74 against switch 75 to shift the arm of the latter to contact 82 (Fig. 14). This opens the circuit to de-energize solenoid 54. Clutch 9 will remain locked in disengaged position by the toggle until the restoring solenoid 66 is subsequently energized.

Solenoid 66 may be energized by restoring the throw switch 81 to the power contact P (Fig. 14). This will close a circuit through the now closed contact 65 to energize solenoid 66. Energization of the latter propels the solenoid core 78 thereof against the tension of restoring spring 83 (Fig. 11) to strike the toggle nose 79, whereupon the associated toggle joint breaks and is restored to its normal position to the right of center, as in Fig. 11. This restoring action removes the screw head 74 from switch 75 (Figs. 11 and 14), allowing the contact arm 76 to spring back to contact 77; it also draws the three-arm lever 57 counter-clockwise (Fig. 11), causing arm 63 to restore. This re-opens switch 65 and de-energizes solenoid 66; it also allows the clutch member 48 (Fig. 4) of clutch 9 (Figs. 1 and 4) to re-engage member 47 under the urging of clutch spring 53.

When the clutch disconnect solenoid 54 (Figs. 1 and 14), so called because of its function, is energized, it is clear that clutch 9 will be disengaged, and the pilot control stick 6 will be disconnected from and ineffective to operate the power transmission device 15 to effect connection of the power unit 7 with the aileron drive shaft 4.

*Control of clutches 8 and 11*

The power control transmission unit 5 is, however, devised so that, when the turbine power unit 7 is disconnected, the control stick 6 may nevertheless be employed to transmit manual power through control shaft 19 to rotate the aileron drive shaft 4. To this end (Figs. 1, 2, 3), the input control shaft 19, to which the pilot stick is connected by linkage 21 and lever 20, carries fast thereon a bevel gear 84 which is in mesh with a complementary bevel gear 85 carried at one end of a shaft 86. The latter is supported at one end for rotatable movement in a housing bearing 87. Carried on the opposite end of shaft 86 is draw clutch 11. The latter clutch comprises a pair of mating members 89, 90, which have opposing jaw faces adapted under urging of a spring 70 to engage with one another. Jaw member 90 is provided with an axially extended sleeve portion 91. The latter is supported for rotatable movement in a bearing block 92. It sleeves bearings 93, whereby this half of the clutch is freely rotatable about shaft 86. Pinned to the end of clutch sleeve 91 is a drive gear 94 (Figs. 2, 6) which engages through idle gearing 95, with a gear 96 that is carried fast upon the aileron drive shaft 4. Clutch member 89 is splined for slidable movement on shaft 86. The arrangement is such that, when clutch 11 is engaged, manual effort exerted through the pilot's stick and control shaft 19 turns the shaft 86 and, through the gearing described, drives the aileron drive shaft 4; shaft 4 is adapted to be driven in one direction or the other, according to the directional movement of the control stick.

Clutch 11 is normally held disengaged against the opposed tension of coil spring 70 by locking mechanism later to be described. While clutch 11 is held disengaged, manual effort exerted through the pilot's stick is ineffective to operate the manual drive gear 94 to cause turning of the aileron drive shaft 4. Solenoid controlled means is also provided for releasing this locking mechanism to permit engagement of the manual drive clutch 11. When manual effort, instead of the turbine power unit, is to be employed in operating the aileron drive shaft 4, it is desirable that the effort required to turn shaft 4 be reduced to a minimum and that unnecessary loads be removed. To this end, other solenoid controlled means 98 is operable to disengage clutch 8 so as to free the aileron drive shaft 4 from the load of the gear train 18.

The solenoid controlled mechanism for effecting engagement of clutch 11 and disengagement of clutch 8, and the converse, includes a pair of solenoids 98 to control clutch 8 and 99 to control clutch 11. These are mounted to a common base plate 101 (Figs. 4, 7-10) which is supported within the control transmission unit 5. These solenoids have duplicate associated structures, the reference characters of one of the structures being primed; and what is said of the structure relative to one solenoid applies to the other. Pivoted in a forked end 100 of the lug of solenoid 98 is a lever 102, the other end of which lever is pinned to a rock shaft 103. Shaft 103 is supported for turning in lugs 104 carried by plate 101. Freely pivoted on shaft 103 is a widely forked member 105, the fork end of which carries opposed projecting pins 106, which engage in a peripheral groove 107 of the slidable member 24 of clutch 8. An end of an adjustable screw 108 carried by a depending arm 109 of fork 105 abuts against a lug 111 carried by lever 102. The arrangement is such that, upon energization of solenoid 98, lever 102 is moved counter-clockwise (Fig. 4), forcing lug 111 against screw 108. This pivots fork 105 counter-clockwise, whereby clutch member 24 is moved against the tension of coil spring 27 out of engagement from clutch member 23 of clutch 8.

*Locking mechanism for clutches 8 and 11*

With the foregoing action, means is provided to automatically lock clutch 8 in its disengaged position and to simultaneously de-energize solenoid 98. To effect this (Figs. 7-19), there is pivoted on cross shaft 103 a further lever 112, which lever is held to a second depending arm 114 of fork member 105 by an eccentric screw 115. Screw 115 allows for angular adjustment of lever 112 relative to fork 105. The free end of lever 112 carries a toggle link 116 which is pivoted (Fig. 9) to a toggle arm 117. The latter is pivoted to a pin 118 projecting from a fixed plate 119. Toggle arm 117 is provided with a torsion spring 120 that is carried on pin 118 and which here is tensioning the toggle arm clockwise (Fig. 9). Toggle arm 117 also carries at its free end an adjustable projecting screw 121 which overhangs an electrical two-way switch 122, the arm of which is normally closed on contact 123 (Fig. 14). It is apparent, that energization of solenoid 98 will through the consequent movement of fork member 105 actuate lever 112 counter-clockwise (Fig. 9) to shift the toggle joint above center, where the toggle will limit and will be locked against an overhanging stop 124 by the toggle spring 120. This will lock the fork member 105 in its moved position, and as a consequence, clutch member 24 of clutch 8 will be held in its disengaged position. Shifting of the toggle joint also acts to press screw pin 121 down upon switch 122 to move the arm thereof (Fig. 14) so as to open contact 123 and to close upon contact 125, thereby de-energizing the circuit to solenoid 98.

Mechanism duplicating that described with respect to solenoid 98 is associated with solenoid 99 and is located at the opposite portion of base plate 101 (Fig. 7). It is employed to disengage the manual drive clutch 11 and to hold it in disengaged position consequent upon the energization of solenoid 99. Since clutch 11 is normally disengaged and clutch 8 is normally engaged, it is clear that the toggle joint of elements 116', 117' associated with the former will normally be in its actuated position above center, as in Fig. 9A, holding clutch 11 disengaged, and that the toggle joint of elements 116, 117, associated with clutch 8 will in normal position be below center as in Fig. 9. In the toggle linkage associated with solenoid 98 the screw pin 121 normally overhangs switch 122; while the screw pin 121' of that associated with solenoid 99 depresses switch 122', and the contact 135 of the latter is normally open, as shown in Figure 14.

Means is provided for releasing the locked toggle mechanism associated with clutch 11, so as to allow this clutch to engage when solenoid 98 is energized. Similar means is provided to release the locked toggle mechanism of clutch 8 so as to allow this clutch to engage when solenoid 99 is energized; and what is said of the structure of one means applies to the other, the reference numbers of one being primed, as appears in Figs. 7-10. As to the structure of the toggle means to release clutch 11, cross shaft 103, associated with solenoid 98, has pinned to an end thereof a lever 126 which is normally urged clockwise (Fig. 8) by a torsion spring 127. Pivoted to the free end of lever 126 is a link 128 to which is linked a further lever 129 that is pinned at its opposite end to an end of a rock shaft 131 which is turnable in a fixed support 132. Pinned to the opposite end of rock shaft 131 is a trip lever 133 carrying a hammer pin 134 which overhangs the toggle joint elements 116', 117' of locking mechanism (Fig. 9A) associated with clutch 11 and solenoid 99. It is clear, that energization of solenoid 98 will not only effect disengagement of clutch 8 as described above, but will also shift its toggle mechanism elements 116, 117, to lock clutch 8 in disengaged position. Further, energization of solenoid 98 will, through lever 102, rock the shaft 103. This in turn will through the linkage to shaft 131 rock the latter to cause the hammer pin 134 to come down to break the toggle joint of elements 116', 117' associated with clutch 11. The hammer pin 134 restores to normal position under the influence of spring 127 upon de-energization of solenoid 98. The latter occurs immediately after the toggle joint associated with clutch 11 is broken. Breaking of the toggle joint associated with clutch 11 and solenoid 99 will cause the toggle arm 117' to release its pin screw 121' from a two-way switch 122'. This causes the contact arm of the latter to switch from a contact 136, as shown in Figure 14, to contact 135, the effect of which will become apparent later on in a discussion of the solenoid circuits. Similar release mechanism, the elements of which are primed, is provided for releasing the locked condition of elements 116, 117 associated with clutch 8, upon energization of solenoid 99.

*Neutral position control*

It is desired that the entire system be at neutral position when shifting takes places from operation of the aileron shaft 4 by turbine power to operation thereof by manual effort. In this respect the disconnect shaft 44 (Fig. 4) has a range of angular movement related to the range of movement of the pilot's stick either side of its neutral position. Shaft 44 is also geared to the range of movement of the control input shaft 19 to either side of the neutral position of the latter as determined by the mechanical follow-up 18 in the power unit and by the travel stops 28, 30 on the aileron drive shaft 4. A pin 137 (Fig. 5) projecting from the left face of the slidable member 48 of the control stick disconnect clutch 9 is receivable in a hole 138 (Fig. 5) of a nearby stationary circular plate 139 when clutch member 48 slides out of engagement from clutch member 47. The hole 138 is located so that the pin 136 is receivable therein only when the system is close to its neutral position; at other times any attempt to disengage clutch 9 will be prevented by the pin abutting the solid surface of plate 139.

*Timing means*

Timing means is provided to limit the duration of current flow to the various solenoids when the latter are energized; and it is arranged to close a switch 140 in the solenoid circuits (shown in Fig. 14) when the system is close to neutral position. To this end, there is provided a cam 141 (Figs. 2, 6) which is supported to the end face of manual drive gear 94 and projects beyond the peripheral surface of the latter. Gear 94 follows the aileron drive shaft 4 to which it is geared, and accordingly turns according to the directional turning of the aileron drive shaft. The cam is adapted to move over switch 140, which is normally tensioned open. In passing over the switch, the cam closes the latter and holds it closed for a short period of time. The cam is of a length sufficient, when turned either side of neutral position NP, to hold the switch closed until selected solenoids have been energized and performed their respective functions.

The circuit for the system is shown in Fig. 14 and will be described in explaining the operation of the invention.

*Operation*

As stated above, the mechanism of the system is normally set for power operation in which situation clutch 11 is disengaged and clutches 8 and 9 are engaged, as shown in Fig. 1. Now, should it be desired to switch from turbine power to manual effort in operating the ailerons, the change-over switch 81 is flipped from contact P to contact M. When the timing switch 140 closes in the return line 142, a circuit is established to energize solenoid 54 from source S, contact M, line 143, normally closed contact 77, line 144, winding of solenoid 54, line 145, return line 142, and closed timing switch 140 to source. Energization of solenoid 54 actuates the tri-armed lever 57 (Figs. 11, 13) to turn shaft 58 clockwise and, as a consequence, causes lever pin 61 to disengage clutch 9. Actuation of lever 57 also draws arm 63 counterclockwise allowing switch contact 65 to be spring closed; it also swings the associated toggle joint to the left of center moving the toggle arm screw 74 against switch 75 and the arm thereof from contact 77 to contact 82. This opens the circuit to de-energize solenoid 54. Clutch 9 will be held in this disengaged position by the shifted toggle members 68, 69 until the restoring solenoid 66 is subsequently energized.

Closing of contact 82 establishes a sequential circuit to energize solenoid 98, traced from source, over line 143, now closed contact 82, line 146, normally closed contact 123, line 147, winding of solenoid 98, return lines 148 and 142, and closed timing contact 140 back to source.

Energization of solenoid 98 actuates, as earlier described, the fork member 105 to disengage clutch 8. This effects a disconnection of the aileron drive shaft 4 from the turbine power unit connected gear train 18. It also operates to shift the associated toggle elements 116, 117 to lock clutch 8 in disengaged position and to act on switch 122 to open contact 123 in the circuit to solenoid 98. The action of solenoid 98 also rocks shaft 103 and the hammer pin 134 to break the toggle lock elements 117', 116' (Fig. 9A) associated with clutch 11, thereby allowing the latter to engage under force of its spring 70. Engagement of clutch 11 connects the aileron drive shaft 4 through the connecting shafts 86, 19 and linkage 21 to the pilot's stick. Breaking toggle of elements 117' and 124' removes pin screw 121' from switch 122' to allow contact 135 to close. Now, manual movement of the pilot's stick to either side of neutral will through the engaged clutch 11 operate the aileron shaft 4 to move the ailerons accordingly.

Now, should it be desired to switch back to operation of the aileron drive shaft by the turbine driven power unit, the change-over switch 81 is flipped over to contact P. Whereupon, after the timing switch 140 closes, a circuit will be established to energize solenoid 99 from source, line 149 now closed, contact 135 of switch 122', line 151, winding of solenoid 99, and return lines 152, 142, and closed contact 140 to source. Energization of solenoid 99 actuates the fork member 105' to disengage clutch 11. This disconnects the manual drive shaft 86 from the aileron drive gear 94. It also shifts the associated toggle elements 116', 117' (Fig. 9A) to lock clutch 11 in disengaged position, and further actuates the associated toggle arm 117' to open contact 135 in the solenoid 99 circuit and to close contact 136. The action of solenoid 99 also rocks shaft 103' and the hammer pin 134' to break the toggle elements 117, 116 (Fig. 9) associated with clutch 8, thereby allowing the latter to reengage under force of its spring 27. Breaking of the toggle elements 117, 116 releases the screw pin 121 from switch 122 allowing contact 123 to spring closed. Engagement of clutch 8 once more connects the aileron drive shaft 4 through the gearing 18 with the turbine drive unit.

Closing of contact 136 establishes a sequential circuit to energize solenoid 66 from source P over line 149, now closed contact 136, line 153, now closed contact 65 and winding 66, through return lines 154, 142, and timing switch 140 to source. Energization of solenoid 66 acts through its core to break the toggle joint elements 68, 69 holding clutch 9 disengaged and permits the latter to restore under tension of spring 53 to engaged position. Breaking of the toggle joint also serves to restore the tri-armed lever 57 and to move screw 64 to re-open contact 65 in the circuit to solenoid 66. The control stick 6 is now disengaged by clutch 11 from operating the manual drive shaft and is engaged through the clutch 9 to control the power transmission device 15 to connect the turbine output shaft 12 with shaft 16, and the latter with the aileron drive shaft 4, through the reengaged clutch 8.

Although an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art, and it is my intent, therefore, to claim the invention, not only as shown and described, but also in all such forms and modifications thereof as may be reasonably construed to be within the spirit of the invention and the scope of the appended claims.

What is claimed is:

1. In a combined manual power and mechanical power transmission control system for aileron control surfaces in an aircraft, a control stick, a control shaft operatively connected to the control stick, an air turbine driven mechanical power unit having an air turbine and a rotatable driven shaft, means for controlling direction of rotation of the driven shaft by said power unit, said direction control means arranged to be operated by said stick control through said control shaft, first clutch means engageable for operatively connecting the said direction control means to the control shaft for stick control of the direction of rotation of the driven shaft by the power unit, an aileron drive shaft, second clutch means engageable for operatively connecting the aileron drive shaft with the said driven shaft of the power unit, third clutch means engageable for operatively connecting the aileron drive shaft with the control shaft, solenoid controlled means to operate said first, second and third clutch means, operator-operative control means for said solenoid controlled means, said solenoid controlled means effective upon operation of the control means in a first sense for engaging the first and second clutch means and disengaging the third clutch means, and said solenoid controlled means effective upon operation of said control means in a second sense for disengaging the first and second clutch means and engaging the third clutch means separate spring means urging said first, second, and third clutches into engaged position, mechanical latching means operatively associated with each clutch to lock the clutch in disengaged position when the respective solenoid controlled means are energized to effect disengagement and timing means to limit the duration of current flow to the solenoid controlled means for a short period of time.

2. In a combined manual power and mechanical power transmission control system for aileron control surfaces, a control stick, a control shaft operatively connected to the control stick, servo-motor means, an output drive shaft rotatable by said motor means, control means for controlling direction of rotation of the output shaft by said motor means, first clutch means engageable for operatively connecting the control means to the control shaft, an aileron drive shaft, second clutch means engageable simultaneously upon engagement of said first clutch means for operatively connecting the aileron drive shaft with the output drive shaft, third clutch means engageable upon disengagement of said first and second clutch means for operatively connecting the aileron drive shaft directly with the control shaft, operator-operative means to effect the engagement of said first and second clutch means and alternately the engagement of said third clutch means, solenoid controlled spring means for engaging the first and second clutch means and solenoid operated means for disengaging the third clutch means simultaneously with engagement of said first and second clutch means, latching means operatively associated with the solenoid operated means for holding the third clutch means disengaged, alternately operable other solenoid operated means for disengaging the first and second clutch means and solenoid controlled spring means for engaging the third clutch means simultaneously with disengagement of said first and second clutch means, and latching means operatively associated with the aforesaid other solenoid operated means for holding the first and second clutch means disengaged.

3. In a control system of the character described, an aileron drive shaft, a pilot operable control stick, a first clutch engageable for operatively connecting the aileron drive shaft with the control stick, a servo motor, a rotatable shaft driven by said motor, means to control direction of rotation of said shaft by said motor, means operatively connecting said control stick to said direction control means, second clutch means engageable for connecting the motor-driven shaft with the aileron drive shaft, spring means normally urging the first clutch into engaged condition, first solenoid controlled means for disengaging the first clutch against the urging of the spring means, first latching means operatively associated with the first solenoid controlled means for holding the first clutch in disengaged position, second spring means normally urging the second clutch to engaged condition, second solenoid controlled means for disengaging the second clutch against the urging of the second spring means, second latching means operatively associated with the latter solenoid controlled means for holding the second clutch in disengaged condition, latch release means operatively associated with the first solenoid controlled means for releasing the second latching means when the first solenoid controlled means is operated, other latch release means operatively associated with the second solenoid controlled means for releasing the first latching means when the second solenoid controlled means is operated, and pilot operable means for alternately operating the first and second solenoid controlled means to selectively connect the aileron drive shaft to said control stick and servo motor.

References Cited in the file of this patent

UNITED STATES PATENTS

| Number | Name | Date |
|---|---|---|
| 1,254,349 | Patch | Jan. 22, 1918 |
| 1,290,199 | Holland | Jan. 7, 1919 |
| 1,453,202 | Stevens | Apr. 24, 1923 |
| 2,146,800 | Beeson | Feb. 14, 1939 |
| 2,394,384 | Hortsmann | Feb. 5, 1946 |
| 2,406,374 | Holt | Aug. 27, 1946 |
| 2,487,116 | Eaton | Nov. 8, 1949 |
| 2,738,149 | Peed | Mar. 13, 1956 |